(12) United States Patent
Pethe

(10) Patent No.: US 12,450,224 B2
(45) Date of Patent: Oct. 21, 2025

(54) FACILITATING PERFORMANCE OF DATABASE OPERATIONS USING MICROSERVICES

(71) Applicant: MASTERCARD INTERNATIONAL INCORPORATED, Purchase, NY (US)

(72) Inventor: Ameya Pethe, Lake Saint Louis, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 18/769,379

(22) Filed: Jul. 10, 2024

(65) Prior Publication Data

US 2024/0362204 A1    Oct. 31, 2024

Related U.S. Application Data

(63) Continuation of application No. 17/459,561, filed on Aug. 27, 2021, now Pat. No. 12,061,595.

(60) Provisional application No. 63/071,345, filed on Aug. 27, 2020.

(51) Int. Cl.
| | |
|---|---|
| *G06F 16/23* | (2019.01) |
| *G06F 9/54* | (2006.01) |
| *G06F 16/21* | (2019.01) |
| *G06F 16/242* | (2019.01) |
| *G06F 16/2452* | (2019.01) |

(52) U.S. Cl.
CPC .......... *G06F 16/2365* (2019.01); *G06F 9/547* (2013.01); *G06F 16/217* (2019.01); *G06F 16/2433* (2019.01); *G06F 16/2452* (2019.01)

(58) Field of Classification Search
CPC .... G06F 16/2365; G06F 9/547; G06F 16/217; G06F 16/2433; G06F 16/2452; G06F 16/25; G06F 9/541
See application file for complete search history.

(56) References Cited

U.S. PATENT DOCUMENTS

| | | |
|---|---|---|
| 7,418,435 B1 | 8/2008 | Sadler |
| 10,572,315 B1 | 2/2020 | Lusk |
| 2008/0244514 A1 | 10/2008 | Hilerio |
| 2008/0313660 A1 | 12/2008 | Malik |

(Continued)

*Primary Examiner* — Albert M Phillips, III
(74) *Attorney, Agent, or Firm* — Barta Jones, PLLC

(57) ABSTRACT

The disclosure herein describes causing a database operation to be performed via a microservice. A translation layer exposes a translation API that is configured to receive commands in an API command format. A command in the API command format is received from a command sender that includes a database type. A microservice configured to perform the received command based on the included database type is identified. The command is transferred to the identified microservice, which is configured to translate the transferred command to a database command format associated with the database type and perform the translated command in association with a database. A response is received from the microservice based on performance of the command by the microservice, wherein the received response is in a response format that is compatible with the exposed translation API, and the received response is provided, via the exposed translation API, to the command sender.

20 Claims, 6 Drawing Sheets

(56) References Cited

U.S. PATENT DOCUMENTS

2017/0351702 A1    12/2017  Sedlar
2018/0075044 A1*    3/2018  Kruglikov ................. G06F 8/62
2020/0084281 A1*    3/2020  Ley ....................... H04L 67/141

* cited by examiner

FACILITATING PERFORMANCE OF DATABASE OPERATIONS USING MICROSERVICES

CROSS-REFERENCE TO RELATED APPLICATION(S)

This application is a continuation of and claims priority to U.S. Non-Provisional application Ser. No. 17/459,561 filed Aug. 27, 2021, entitled "FACILITATING PERFORMANCE OF DATABASE OPERATIONS USING MICROSERVICES", which claims benefit of U.S. Provisional Application No. 63/071,345 filed Aug. 27, 2020, entitled "Facilitating Performance of Database Operations Using Microservices", the entireties of which are hereby incorporated by reference herein.

BACKGROUND

In many modern, complex enterprise systems and other networked computing systems, a variety of different types of databases may be used for a variety of purposes. In such cases, developers and other users on the systems must have knowledge of the languages of each of the databases with which they want to interact. Further, in some examples, separate tools must be used for each type of database to enable and/or automate certain database functionality, such as provisioning new databases. To users of these systems, keeping track of the various types of databases and maintaining the language knowledge required to effectively interact with the databases present a significant challenge that reduces the efficiency of those users when working with the different types of databases.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for causing a database operation to be performed via a microservice is described. A translation layer is configured to expose a translation application program interface (API) that is configured to receive commands in an API command format. A command in the API command format is received via the exposed translation API from a command sender and the received command includes a database type of a plurality of database types. The translation layer identifies a microservice configured to perform the received command based on the included database type from a plurality of microservices, wherein each microservice of the plurality of microservices is configured to be compatible with a database type of the plurality of database types. The received command in the API command format is transferred to the identified microservice, wherein the identified microservice is configured to translate the transferred command from the API command format to a database command format associated with the database type included in the command and perform the translated command in the database command format in association with a database of the database type included in the received command. A response is received from the identified microservice based on performance of the received command by the identified microservice, wherein the received response is in a response format that is compatible with the exposed translation API, and the received response is provided, via the exposed translation API, to the command sender.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 6, the systems are illustrated as schematic drawings. The drawings may not be to scale.

DETAILED DESCRIPTION

Aspects of the disclosure provide a computerized method and system for causing a database operation to be performed via a microservice. A translation application program interface (API) is exposed by a processor of a translation layer, wherein the translation API is configured to receive commands in an API command format. Later, a command, in the API command format and including a database type, is received via the exposed translation API from a command sender. A microservice configured to perform the received command is identified based on the included database type. The microservice is identified from a plurality of microservices, wherein each microservice is configured to be compatible with a database type of a plurality of database types. The command is then transferred to the identified microservice, wherein the identified microservice is configure to translate the transferred command from the API command format to a database command format associated with the database type included in the command and to perform the translated command in the database command format in association with a database of the database type included in the received command. A response is received from the identified microservice based on performance of the command by the microservice, wherein the received response is in a response format that is compatible with the exposed translation API and the received response is provided to the command sender via the translation API.

The disclosure addresses the challenges of managing and interacting with different types of databases within a system, including the need for a user of the system to know multiple database languages and to use multiple different tools to perform operations on or in the multiple different types of databases. By providing a translation layer that is configured to receive database commands in a single format and to cause those commands to be translated to database-specific formats and performed on target databases. The disclosure operates in an unconventional way at least by creating, controlling, and/or otherwise maintaining a plurality of microservices configured for translating and performing commands in association with specific types of databases. Further, the disclosure provides users with a unified API that can be used to provision and perform operations on any databases of compatible database types in a system in a streamlined, user-friendly way, thereby improving the human-machine interface with respect to the described systems.

Figure 1:
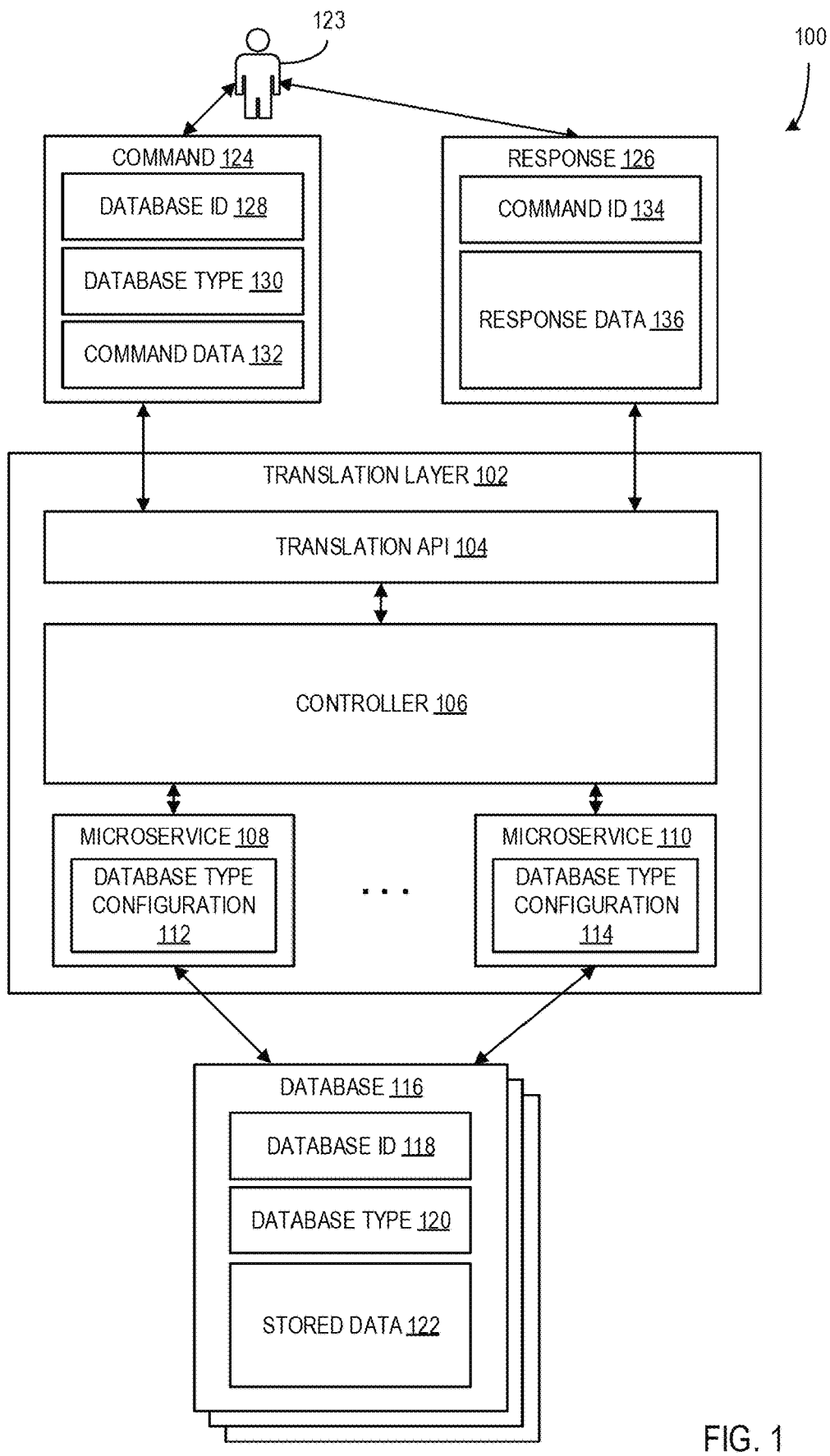
FIG. 1 is a block diagram illustrating a system configured for performing database commands via database-compatible microservices according to an embodiment.

FIG. 1 is a block diagram illustrating a system 100 configured for performing database commands (e.g., command 124) via database-compatible microservices (e.g., microservices 108-110) according to an embodiment. The system 100 includes a translation layer 102 that includes a translation application program interface (API) 104, a controller 106, and a plurality of microservices 108-110. The translation layer 102 includes hardware, firmware, and/or software configured to receive commands (e.g., command 124) from users (e.g., user 123), or command senders, via the translation API 104, identify, by the controller 106, compatible microservices from a plurality of available microservices 108-110, and provide the received commands to the identified, compatible microservices, wherein the microservices perform the commands on target databases (e.g., databases 116). Further, the translation layer 102 is configured to provide output of the performed commands in the form of responses (e.g., response 126) to the users that sent the performed commands via the translation API 104 in a format that is compatible with that API 104.

In some examples, the translation layer 102 is implemented in a backend platform of an enterprise system associated with a company or other entity, such that the interactions with the internal databases of the enterprise system may be performed by users using a command format that is compatible with the API 104, rather than requiring users to tailor database commands to the specific types of databases with which they wish to interact. Alternatively, or additionally, the translation layer 102 may be implemented for use in providing access to public data systems, such as cloud data storage platforms or the like, enabling users with access to the system through the Internet or other public network access to perform database operations in the cloud storage system using the unified, API-compatible command format as described herein.

Figure 2:
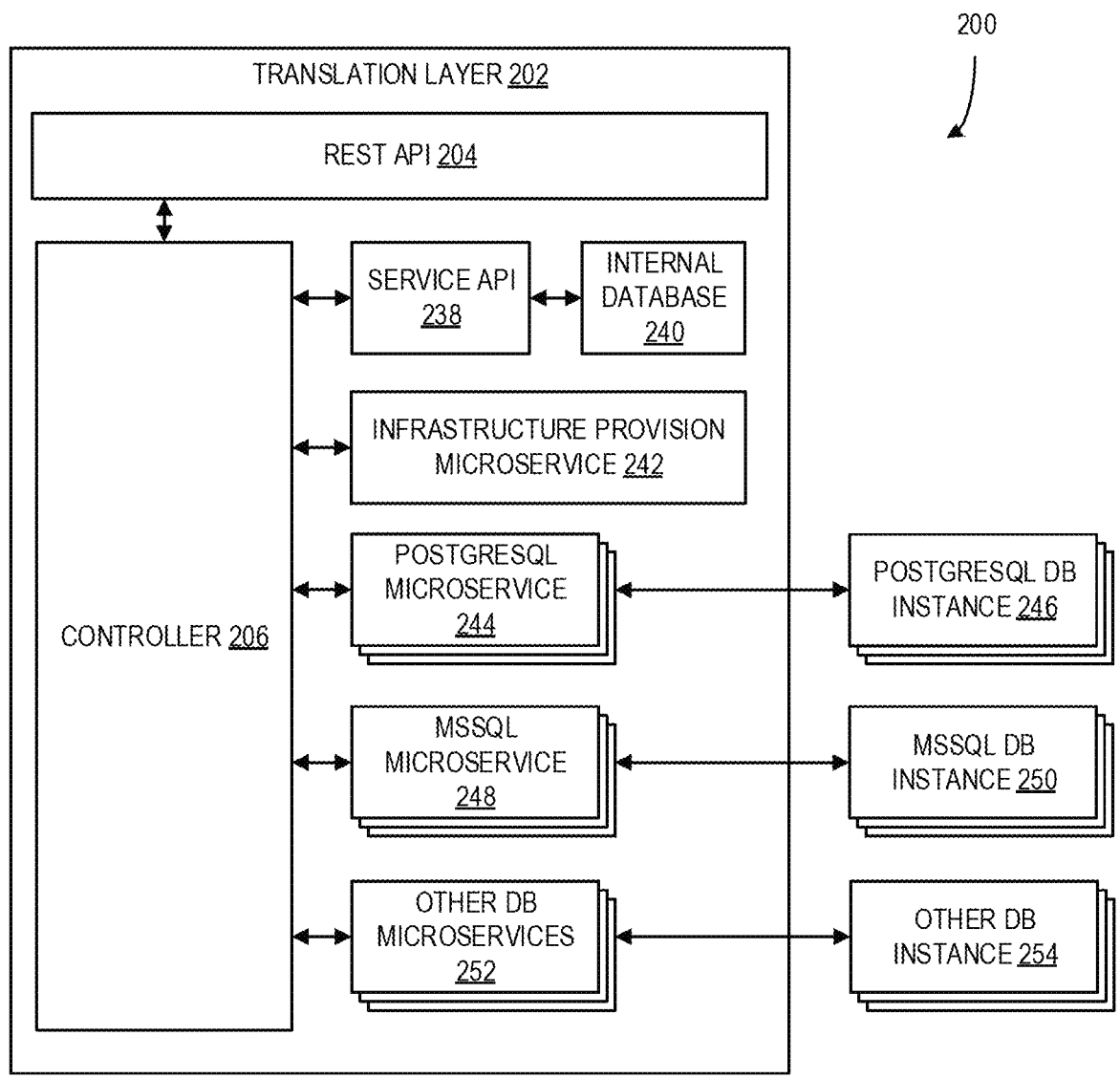
FIG. 2 is a block diagram illustrating a system configured for receiving database commands via a REST API and performing the commands via database-compatible microservices according to an embodiment.

The translation API 104 includes hardware, firmware, and/or software configured specifically to be exposed to provide access to users, receive commands from the users that are in defined API-compatible format, and sending or otherwise providing responses to commands back to users using the same exposed access points. In some examples, the translation API 104 is configured as a Representational State Transfer (REST) API (as illustrated in FIG. 2 and described below), but it should be understood that, in other examples, the API 104 may be configured as a different type of API without departing from the description herein. Further, in some examples, the translation API 104 includes multiple APIs of different types and the multiple APIs may or may not include a REST API without departing from the description herein.

The translation API 104 is further configured to send or otherwise provide received commands from the users to the controller 106 and to receive associated responses from the controller 106. In some examples, the API 104 pushes received commands to the controller 106 for processing using a defined interface between the two modules. Alternatively, or additionally, the API 104 may be configured to temporarily store received commands until they are requested or otherwise pulled from the API 104 by the controller 106. The transfer of responses between the controller 106 and the API 104 may also include at least one of pushing of responses by the controller 106 to the API 104 for provision to the user 123 and/or pulling of responses from the controller 106 by the API 104 without departing from the description herein.

The controller 106 is a module that includes hardware, firmware, and/or software configured for receiving and processing commands 124, managing microservices 108-110, and engaging the microservices 108-110 to perform commands 124 with which they are compatible, as described herein. Upon receiving a command 124 from the translation API 104, the controller 106 is configured to parse or otherwise interpret the data of the command 124 to determine what type of microservice will be used to perform the command (e.g., determining whether the database type configuration 112 of the microservice 108 and/or the database type configuration 114 of the microservice 110 are compatible with the command 124). In some examples, the interpretation of the command 124 includes identifying the database ID 128, an identifier of a particular database instance in the databases 116 to which the command 124 is directed, and/or identifying the database type 130, which is an indicator that generically identifies a type of database that the command 124 is intended for (e.g., Structured Query Language (SQL), MICROSOFT SQL (MSSQL), POSTGRESQL, MYSQL, etc.). The controller 106 is configured to use one or both of these data points to determine a microservice from the microservices 108-110 that is compatible with the received command. For instance, if the command 124 includes a database type 130 of 'SQL', the controller 106 may determine that an available microservice that is configured to handle 'SQL' commands (e.g., if microservice 108 has a database type configuration 112 associated with SQL-type databases) will be used to perform the command 124. Upon the determination of the microservice to be used, the controller 106 is configured to provide the command 124 to the determined microservice and instruct or otherwise cause the microservice to perform the command 124 and return any response back to the controller 106.

In some examples, controller 106 is configured to use more, fewer, and/or different types of command data to determine a compatible microservice with which to perform a command. For instance, in addition to a database type 130 indicator, the command 124 may further include a version of the database for which the command is intended. The controller 106 is configured to use that version information in addition to the database type 130 to determine or identify a compatible microservice. Other command data that may be used includes command type data (e.g., microservices may be configured to perform only a certain type or types of commands, such as a microservice that only performs 'read' commands on a defined type of database or a microservice that only performs commands that create and/or provision a defined type of database), database ID data (e.g., a microservice may be configured to only perform commands on a particular database), and/or the like. Alternatively, or additionally, the controller 106 may be configured to maintain a list or other data structure of information about databases, such as a list that maps database IDs to database types and/or other database category information. In such a case, the command 124 may be configured to include a database ID 128 and may not include a database type 130 because the controller 106 is configured to use the stored database information to determine the database type and other category information from the provided database ID 128 in the command 124.

Further, the controller 106 is configured to manage the microservices 108-110, including generating or otherwise creating microservices and monitoring the states of the microservices. In some examples, the controller 106 stores and maintains a plurality of microservice definitions or templates that enable the controller 106 to "spin up" or otherwise create microservices of particular types on demand. Additionally, the controller 106 may store state information about each of the current microservices 108-110 which the controller 106 uses when determining microservices for use with received commands 124. For instance, the stored microservice state information may indicate whether the microservices are available (e.g., not currently performing a command and/or currently able to perform a command) or occupied (e.g., currently performing a command and/or currently unable to perform a command). In such examples, the controller 106 is configured to only select from available microservices when determining compatible microservices for performing received commands as described herein. In further examples, if the controller 106 does not find an available microservice that is compatible for a received command based on the stored microservice state information, the controller 106 is configured to create a new microservice that is compatible with the received command based on a stored microservice definition that is associated with the database type and/or other database category information of the received command.

In addition to creating new microservices, in some examples, the controller 106 is configured to monitor the need for microservices (e.g., the rate at which commands are received or the rates at which certain database types of commands are received) and determine when to deactivate or destroy microservices that are unlikely to be needed. Such determinations may be made based on defined rules that are used to evaluate the monitored microservice need data and deactivate microservices as indicated thereby. Further, the controller 106 may be configured to monitor the health of the microservices that are active (e.g. monitoring whether the microservices are malfunctioning, hanging, or otherwise failing) and, based on identifying microservices that are failing, the controller 106 may be configured to deactivate or destroy those identified microservices.

In some examples, the controller 106 is configured to cause multiple microservices 108-110 to perform multiple commands 124 in parallel when possible. For instance, if the translation layer 102 receives two or more commands 124 at the same time or substantially the same time, the controller 106 may be configured to send each command to a separate compatible microservice from the microservices 108-110 such that the separate microservices perform the received commands at substantially the same time. While, in some situations, this may not be possible (e.g., multiple commands being performed on the same database may need to be performed serially and/or in a specific order), parallelization of the performance of commands by the controller 106 when possible may significantly increase the speed and efficiency with which large quantities of commands are performed.

The microservices 108-110 are services that are created and configured for translating and performing commands (e.g., command 124) with specific types of databases and/or with specific databases. In some examples, each microservice 108-110 is configured to perform a specific task or small set of tasks in its own process or thread. Each of the microservices 108-110 includes a database type configuration (e.g., database type configurations 112, 114) which defines how the associated microservice behaves upon receiving a command 124 from the controller 106 as described herein. The database type configuration of a microservice is further used by the controller 106 when determining whether the microservice is compatible with a command 124 received by the controller 106.

In some examples, a microservice is configured to receive a command 124 that is still in an API-compatible format and translate at least the command data 132 (e.g., the data that defines the specific command to be performed and any other data necessary to perform it, such as a database query command that includes table information, and fields to be retrieved) to a format that is compatible for use with the target database. A microservice may be configured to only translate received commands to one database-compatible format or even to one version of a database-compatible format (e.g., some database formats may have differing versions and the microservice may be configured to only be compatible with one version). Alternatively, or additionally, microservices may be configured to be specifically compatible to a particular database or database instance and/or specifically compatible to one or more types of commands (e.g., read or query commands, write command, database creation commands).

As described above, the microservices 108-110 are created and monitored by the controller 106, though each microservice may be executed on a separate process. Use of such separate processes enables the performance of multiple commands on microservices in parallel with each other, as described herein. The controller 106 is configured to create microservices with specific database type configurations based on the stored microservice definitions or templates previously mentioned. Each type of microservice 108-110 may be created by the controller 106 using a different microservice definition, which may be added to, edited or updated on, or removed from the controller 106.

Further, it should be understood that the translation of the API-compatible command data 132 to native database-compatible command data may be based on defined translation rules that are included in the microservice definitions on the controller 106 and provided to microservices 108-110 in the associated database type configurations 112-114 upon creation of the microservices. Such translation rules may be configured to translate the command data from an API-compatible format to a native database-compatible format in any way without departing from the description herein.

Upon translating a received command, each microservice 108 is configured to perform the translated command or otherwise cause the translated command to be performed on a target database 116. The way that the command is performed may be based on the type of the database 116 and how the microservice is configured to interface with the database. It should be understood that a microservice may be configured to cause a translated command to be performed on a target database in any way that is compatible with that database without departing from the description herein.

The databases 116 are data stores including hardware, firmware, and/or software configured to store stored data 122 in a format that is compatible with each database's respective database type 120 and to interact with one or more microservices 108-120 based on commands 124 received from users 123 by the translation layer 102 as described herein. Each database 116 includes a database ID 118 that identifies the database, a database type 120 that defines the format of the database, and the stored data 122 that is stored within the database. As described herein, the database type 120 may be used by the translation layer 102 and/or modules therein to determine compatibility of the database 116 with one or more of the microservices 108-110 when processing a command 124.

In some examples, commands being performed by microservices 108-110 on the databases 116 read data from the stored data 122 of the databases, write data to the stored data 122 of the databases, change data in the stored data 122 of the databases, and/or delete data from the stored data 122 of the databases. Additionally, or alternatively, the commands being performed cause one or more databases 116 to be created, provisioned, and/or deleted. In examples where a database is being created, the command being performed does not have a specific target database, but rather performance of the command creates a database or database interest according to a configuration defined in the command and returns a database ID 118 of the created database, such that future commands can be directed to the created database.

It should be understood that the databases 116 may include one or more databases in any combination of database types, database versions, and/or database configurations without departing from the description herein.

In many examples, after the performance of a command on a target database, the database provides a response to the command (e.g., a database ID for a newly created database, query results in response to a database query, status data of a database in response to a status query) in the form of response data to the microservice that caused the command to be performed. The microservice is configured to translate the response data into an API-compatible response format and provide it to the controller 106, which provides the API-compatible formatted response data to the translation API 104, which, in turn, sends it to the user 123 in the form of a response 126 to the command 124. The response 126 includes a command ID 134 that is an identifier of the associated command 124 and response data 136.

The command ID 134 enables the user 123 to identify the command 124 with which the received response 126 is associated and the response data 136 includes the response data to the performance of the command 124 in a format that is compatible with the translation API 104 and based on the type of the command 124 (e.g., if the command was a query for data from a database, the response data 136 may include a set of data values). In some examples, the response 126 includes response data 136 in the form of JavaScript Object Notation (JSON), but in other examples, the response 126 may be formatted in a different manner without departing from the description.

It should be understood that, while the microservices described herein are configured to perform operations on databases of various types, in other examples, microservices may be configured to perform data operations, such as reading data and writing data, on other forms of data structures or data stores (e.g., data files, lists, arrays, etc.) without departing from the description.

FIG. 2 is a block diagram illustrating a system 200 configured for receiving database commands via a REST API 204 and performing the commands via database-compatible microservices (e.g., microservices 242, 244, 248, and 252) according to an embodiment. The system 200 includes a translation layer 202 with a translation API configured as REST API 204. The REST API 204 interacts with the controller 206 in substantially the same way as described above with respect to the translation API 104 and controller 106 of system 100 in FIG. 1.

In some examples, the REST API 204 is configured to receive two types of commands. The first type is configured to provide an "infrastructure as code" method for creating and provisioning databases. The custom endpoint included in such commands is "/:api_version/:database_type/:service_catalog/:function" and it provides a way to deploy or destroy a standardized database. The api_version is a way of versioning the API calls on the system end, the database_type indicates the type of backed database that will be used, the service_catalog is a catalog UUID of some standardized database structures that are predefined by the system, and the function indicates the task to be performed (e.g., CREATE tasks, DELETE tasks, DESTROY tasks). Further, such commands may include a JSON body that is attached to the POST call and contains the table structure of the database to be created.

The second type of command is used to interact with a database that is already created. This type of command has custom endpoints that include "/:api_version/:instance_id", wherein the api_version indicates a version of the API calls on the system end and the instance_id is a unique identifier of the database or table that is the target of the command. Various REST API HTTP calls can be performed using this command. For instance, commands may include POST calls to create new rows in a table (e.g., a JSON body may be included that provides the data to be added to the row), GET calls to run queries and output the results (e.g., a JSON body is provided in response to the call that includes the result data), and DELETE calls to remove a row from the table, which may also include details in a JSON body.

The controller 206 is configured to interact with an OSB service 238 and an internal database 240 and manage a variety of microservices, including an infrastructure provision microservice 242, POSTGRESQL microservices 244, MSSQL microservices 248, and other database microservices 252. It should be understood that, while only POSTGRESQL and MSSQL microservices are specifically illustrated in FIG. 2, in other examples, more, fewer, or different types of microservices may be included in the system without departing from the description herein.

The service API 238 is configured enable access to the internal database 240 and/or other components of the system 200. In some examples, the service API 238 is enabled and/or managed by a service broker component (e.g., an Open Service Broker (OSB) component) which is configured to manage the lifecycles and associated functionality of the services of the system 200 (e.g., provisioning service instances, deprovisioning service instances, and/or connecting and disconnecting applications and/or containers to and from those service instances. It should be understood that such a service broker component or components may be configured to manage the lifecycles of some or all of the services of system 200 (e.g., infrastructure provision microservices 242, POSTGRESQL microservices 244, MSSQL microservices 248, and other database microservices 252).

In some examples, the internal database 240 of the translation layer 202 is configured for storing data used by the controller 206 in managing the processing of the commands received from the REST API 204 and interacting with the microservices. For instance, the internal database 240 may be configured to store microservice definitions that the controller 206 uses to create new microservices of various types, microservice state data that controller 206 uses to monitor the states of the current microservices, and/or database category information that the controller 206 uses when determining microservices that are compatible with databases as described above with respect to FIG. 1.

The infrastructure provision microservice 242 is configured to provision and/or otherwise configure infrastructure for use by the controller 206 and/or other microservices when processing received commands. In some examples, for instance, creating new databases based on received commands requires the provisioning of some infrastructure within the system 200 prior to the creation of the databases based on the received commands (e.g., allocation of resources for use by the new databases).

The system 200 further includes POSTGRESQL database instances 246, MSSQL database instances 250, and other database instances 254. Each type of database instance shown may be created, read, written to, updated, and/or removed through commands performed by the respective microservices 244, 248, and 252 as described herein. For instance, a command received via the REST API 204 to update a POSTGRESQL database instance 246 is provided to an available POSTGRESQL microservice 244, where the command is translated from the REST API format into a native POSTGRESQL format and performed on the target database instance 246. A response from performing the command is then returned to the microservice 244, where it is translated into a REST API formatted response and returned to the sender of the command via the REST API 204.

An example REST API request and associated response for provisioning a database that stores contact information for people is provided below:

```
Request:
HTTP POST <api>/provision
BODY
{
    "version": 1.0,
    "replication": true,
    "active-active": false,
    "disaster-recovery": "regional",
    "rdbms": true,
    "schema": {
        "column": {
            "name": "UUID",
            "type": "text",
            "primary-key": true
        },
        "column": {
            "name": "first name",
            "type": "text",
            "primary-key": false
        },
        "column": {
            "name": "last name",
            "type": "text",
            "primary-key": false
        },
        "column": {
            "name": "phone number",
            "type": "text",
            "primary-key": false
        },
        "column": {
            "name": "email",
            "type": "text",
            "primary-key": false
        },
        "column": {
            "name": "address",
            "type": "text",
            "primary-key": false
        },
    }
}
```

```
Response:
HTTP 200
BODY
{
    "version": 1.0,
    "instance-id": <database instance ID>,
    "url": "<api>/status/<database instance ID>
    "status": "provisioning"
}
```

The above example REST API request includes a command in a JSON format that identifies the request as being a "provisioning" request in the form of "HTTP POST <api>/provision" and a "BODY" section that includes key-value pairs that define the specific configuration of the database to be provisioned. The first set of key-value pairs, "version": 1.0, "replication": true, "active-active": false, "disaster-recovery": "regional", and "rdbms": true, define the version used for the database instance and some settings of the database instance. These pairs are followed by a nested schema that defines the various columns that are to be included in the provisioned database instance. The columns are UUID, first name, last name, phone number, email, and address, which will enable the provisioned database to store names and contact information of people.

The associated REST API response includes a response in a JSON format that includes a "BODY" section that identifies the version of the created database instance, an identifier, "instance-id", that is an identifier of the created database instance, a "url" field that includes a string that can be used to access the created database instance in later commands, and a "status" field that indicates the current status of the created database instance.

An example REST API request and associated response for adding a row to the created database that stores contact information for people is provided below:

```
Request:
HTTP POST <api>/service-instances/<database instance ID>
BODY
{
    "version": 1.0,
    "method": "add-row",
    "data": {
        "UUID": <ROW UUID>,
        "first name": "john",
        "last name": "doe",
        "phone number": <phone number>,
        "email": <email address>,
        "address": <address>
    }
}
Response:
HTTP 201
```

The above example REST API request includes a command in a JSON format that identifies the target database instance of the request (<api>/service-instances/<database instance ID>) and a "BODY" section that identifies the method to be performed as "add-row". The "BODY" further includes a "data" section that includes key-value pairs identifying each value to be added to the columns of the row being added. The associated response includes an HTTP message that includes a code 201 indicating that the adding of the row was successful.

An example REST API request and associated response for querying the created database that stores contact information for people is provided below:

```
Request:
HTTP GET <api>/service-instances/<database instance ID>
BODY
{
    "version": 1.0,
    "method": "query",
    "data": {
        "phone number": <queried phone number>
    }
}
Response:
HTTP 200
BODY
{
    "version": 1.0,
    "result": "success",
    "number of hits": 1,
    "data": {
        "UUID": <Row UUID>,
        "first name": "john",
        "last name": "doe",
        "phone number": <queried phone number>,
        "email": <email address>,
        "address": <address>
    }
}
```

The above example REST API request includes a command in a JSON format that identifies the target database instance of the request (<api>/service-instances/<database instance ID>) and a "BODY" section that identifies the method to be performed as "query". The "BODY" further includes a "data" section that includes a key-value pair identifying the contact information to be queried which, in this case, is a particular phone number. The associated response includes an HTTP message that includes a code 200 indicating success and a "BODY" section that includes the results of the query. The results include an indicator that the query was a success, a number of hits for the query, and the data values of the row of the query result.

Figure 3:
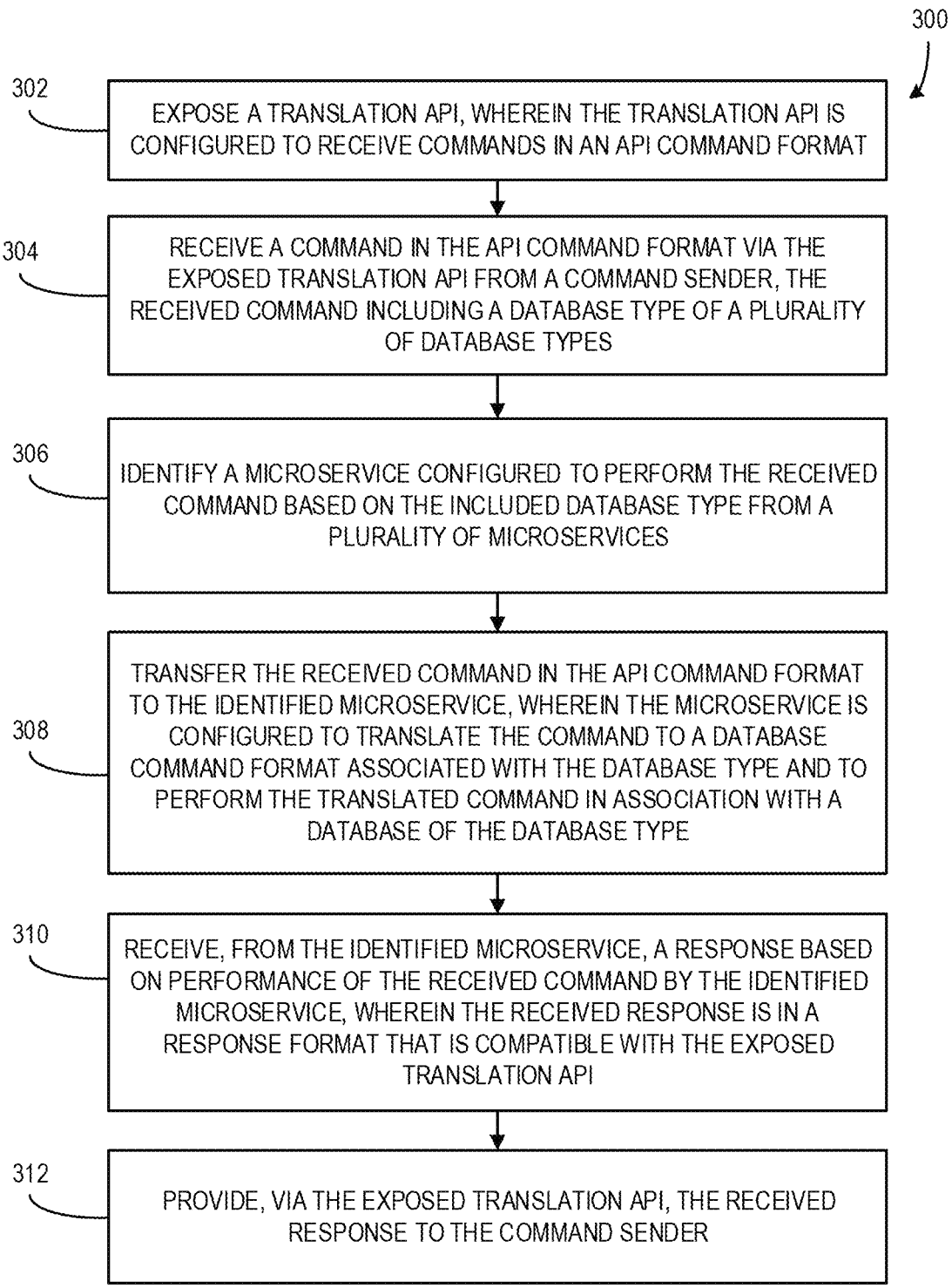
FIG. 3 is a flow chart illustrating a computerized method for causing a database operation to be performed via a microservice according to an embodiment.

FIG. 3 is a flow chart illustrating a computerized method 300 for causing a database operation to be performed via a microservice according to an embodiment. In some examples, the method 300 is performed by one or more components of a system, such as translation layer 102 of system 100 as described herein. At 302, a translation API (e.g., translation API 104) is exposed, wherein the translation API is configured to receive commands (e.g., command 124) in an API command format. In some examples, the API command format is a REST API format that may include JSON data structures.

At 304, a command is received in the API command format via the exposed translation API from a command sender (e.g., user 123), the received command including a database type of a plurality of database types. In some examples, the received command includes a database type in the form of a database type indicator that indicates that the command is to be applied to a specific type of database (e.g., a command to provision a new database instance of the indicated type). Additionally, or alternatively, the command may include a database instance identifier that identifies a specific database at which the command is targeted. In such cases, the database instance identifier may be used to determine the database type of the target database as described herein, such that the database instance identifier provides the database type for the command.

At 306, a microservice configured to perform the received command is identified. The identification of the microservice is based on the included database type and the microservice is identified from a plurality of microservices, wherein each microservice of the plurality of microservices is configured to be compatible with a database type of the plurality of database types. In some examples, identifying the microservice is further based on identifying a microservice that is configured to perform or otherwise compatible with a command type of the received command and/or the specific database instance at which the received command is targeted. Further, identifying the microservice may include determining if a compatible microservice is available and, if no compatible microservice is available, creating a compatible microservice from a microservice definition as described herein, such that the created microservice is then used as the identified microservice throughout the method 300.

At 308, the received command in the API command format is transferred to the identified microservice, wherein the identified microservice is configured to translate the transferred command from the API command format to a database command format associated with the database type included in the command and to perform the translated command in the database command format in association with a database of the database type included in the received command.

At 310, a response is received from the identified microservice based on performance of the received command by the identified microservice, wherein the received response is in a response format that is compatible with the exposed translation API (e.g., a response in a REST API format which may include data in a JSON data structure as described herein). In some examples, the response includes a command identifier that identifies the command with which the received response is associated. Further, the response may include status information indicating whether the command was a success or failure and/or data from the database that is the result of performance of the command (e.g., query results from the database in response to a query command being performed on the database). At 312, the received response is provided, via the exposed translation API, to the command sender.

Figure 4:
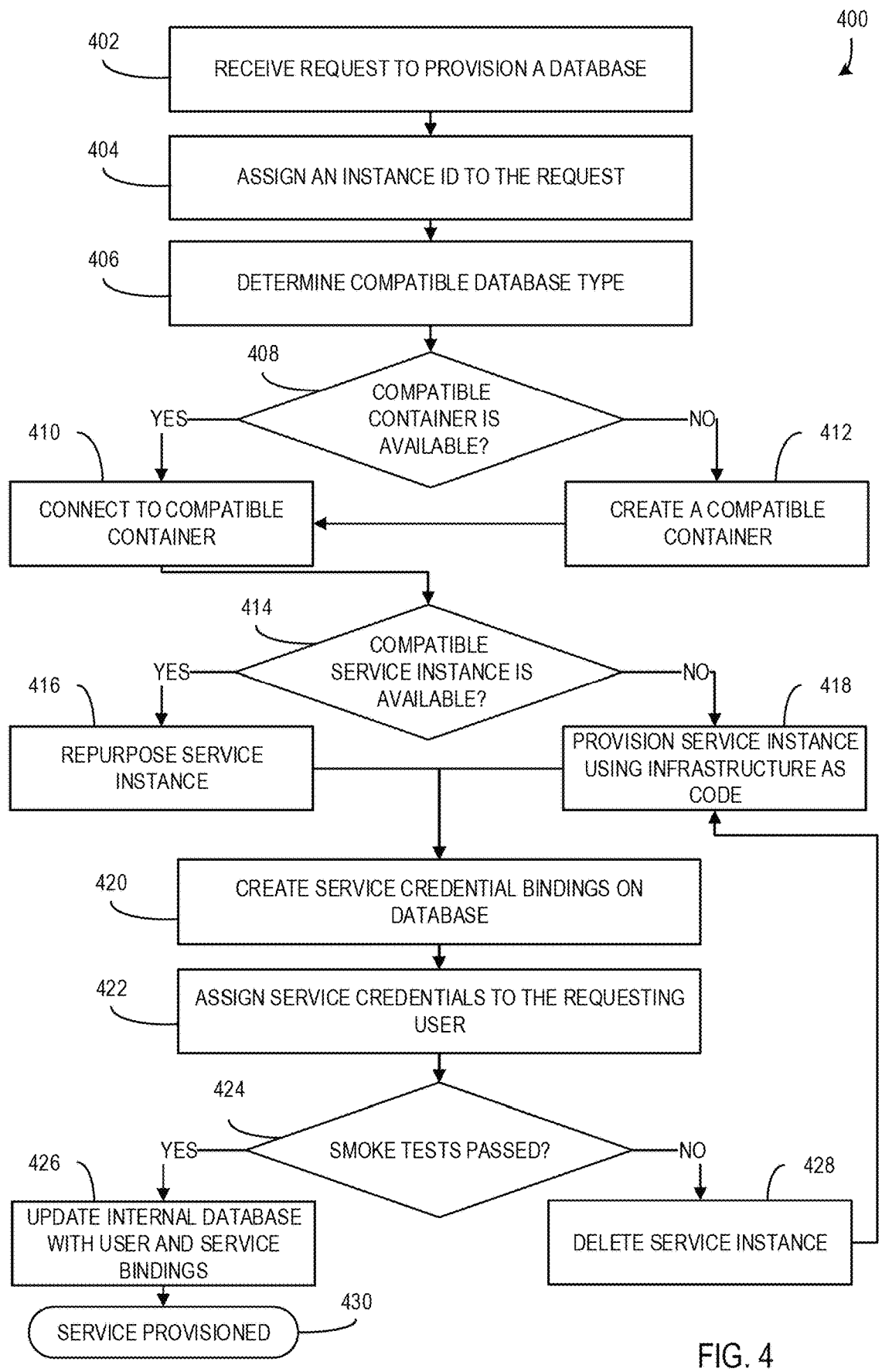
FIG. 4 is a flow chart illustrating a computerized method for provisioning a database via a microservice according to an embodiment.

FIG. 4 is a flow chart illustrating a computerized method 400 for provisioning a database via a microservice according to an embodiment. In some examples, the method 400 is performed by one or more components of a system, such as translation layer 102 of system 100 as described herein. At 402, a request to provision a database is received. At 404, an instance identifier is assigned to the request. At 406, a compatible database type is determined.

At 408, if a compatible container is available, the process proceeds to 410 to connect to the compatible container. Alternatively, if no compatible container is available, the process proceeds to 412 to create a compatible container and then connect to that created compatible container at 410. In some examples, containers are configured to contain database instances of specific types and/or configurations. A controller (e.g., controller 106) may be configured to track and/or manage current containers that may be used to host or otherwise contain database instances, including configuration information indicating the types or configuration of database instances with which each container is compatible. Further, creating compatible containers may include the controller creating containers based on stored database configuration or definition information.

At 414, if a compatible service instance is available, the process proceeds to 416 to repurpose the compatible service instance for use in provisioning the requested database. Alternatively, if a compatible service instance is not available, the process proceeds to 418 to provision a service instance using infrastructure as code.

At 420, service credential bindings of the compatible service instance are created on the database and, at 422, the service credentials are assigned to the requesting user.

At 424, if the smoke tests are passed, the process proceeds to 426 to update the internal database with user and service bindings and the service is provisioned at 430. Alternatively, if the smoke tests are not passed at 424, the process proceeds to 428 to delete the service instance, after which another service instance is provisioned using infrastructure as code at 418. In some examples, the smoke tests are done to validate the workings of the tested component or container. For instance, a smoke test may be configured to test if a database technology version is the requested version and/or if tables and entries have been created in a database using an API.

Figure 5:
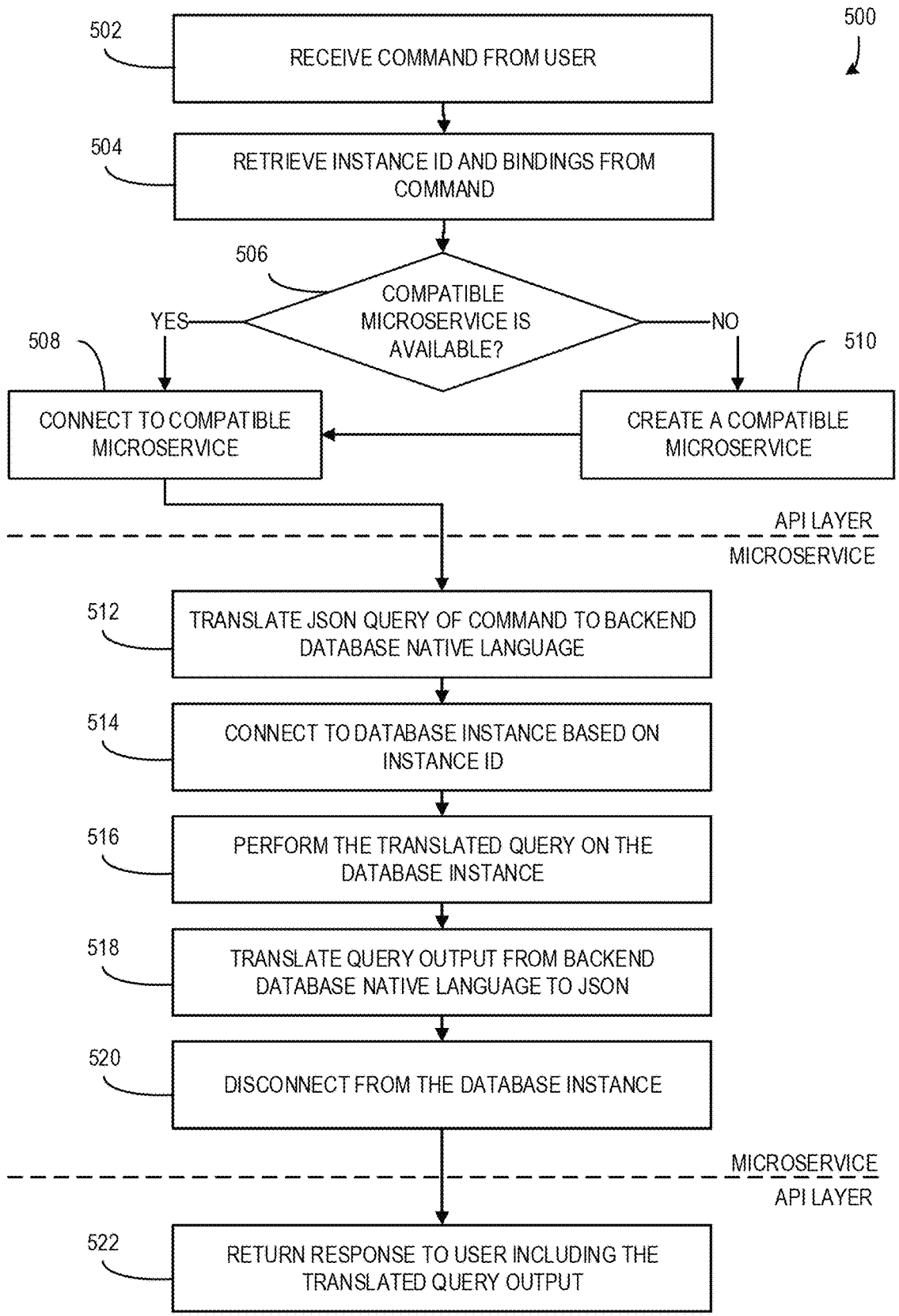
FIG. 5 is a flow chart illustrating a computerized method for causing a database operation to be performed on an identified database instance via a microservice according to an embodiment.

FIG. 5 is a flow chart illustrating a computerized method 500 for causing a database operation to be performed on an identified database instance via a microservice according to an embodiment. In some examples, the method 500 is performed by one or more components of a system, such as translation layer 102 of system 100 as described herein. At 502, a command is received from a user and, at 504, an instance identifier and bindings are retrieved from the command.

At 506, if a compatible microservice is available, the process proceeds to 508 to connect to the compatible microservice. Alternatively, if no compatible microservice is available at 506, the process proceeds to 510 to create, or "spin up", a compatible microservice and then connect to the created microservice at 508.

At 512, the process is handed off to the connected microservice to translate the JSON query of the command to a backend database native language. At 514, the microservice connects to the database instance based on the instance identifier included in the command and, at 516, the microservice performs the translated query, or otherwise causes it to be performed, on the connected database instance.

At 518, the microservice translates the query output from the backend database native language to JSON-formatted query output data and, at 520, the microservice disconnects from the database instance.

The process is then handed back to the API layer and, at 522, a response is returned to the user that sent the command, including the JSON-formatted query output data.

Additional Example Scenarios

Aspects of the disclosure enable various additional scenarios, such as next described.

In an example, a user accesses a translation API of a translation layer configured as described herein. The user sends a command to the translation layer to create a database of a first database type via the translation API. The command is in a REST format and includes a JSON body that provides a structure of the database to be created. The controller of the translation layer identifies an available microservice that is compatible with the first database type and configured to provision and create new databases. The controller transfers the command to the identified microservice.

The microservice receives the command and translates it into a native database language based on the first database type by applying defined translation rules that are included in the microservice. The microservice then performs the translated command by creating and provisioning a new database of the first database type with a table structure based on the included JSON body of the command. The microservice then provides a response to the controller based on the successful creation of the database that includes a unique identifier of the new database for use in accessing and interacting with the new database. The controller returns the response, including the unique identifier, to the user via the translation API.

In a related example, the user sends a command for adding several rows of data to the newly created database to the translation layer via the translation API. At around the same time, a second user sends a command to interact with another database of a second database type to the translation layer as well.

The controller receives both commands. A first microservice is identified that is configured to perform the command on the database of the first database type and a second microservice is identified that is configured to perform the command from the second user on a database of the second database type. The controller transfers the command from the first user to the first microservice and the command from the second user to the second microservice at approximately the same time. The first and second microservices are running on separate processes, so the translation and performance of both commands are done in parallel on the separate microservices. Once complete, the microservices send responses to the controller, which are then forwarded back to the respective users.

Exemplary Operating Environment

Figure 6:
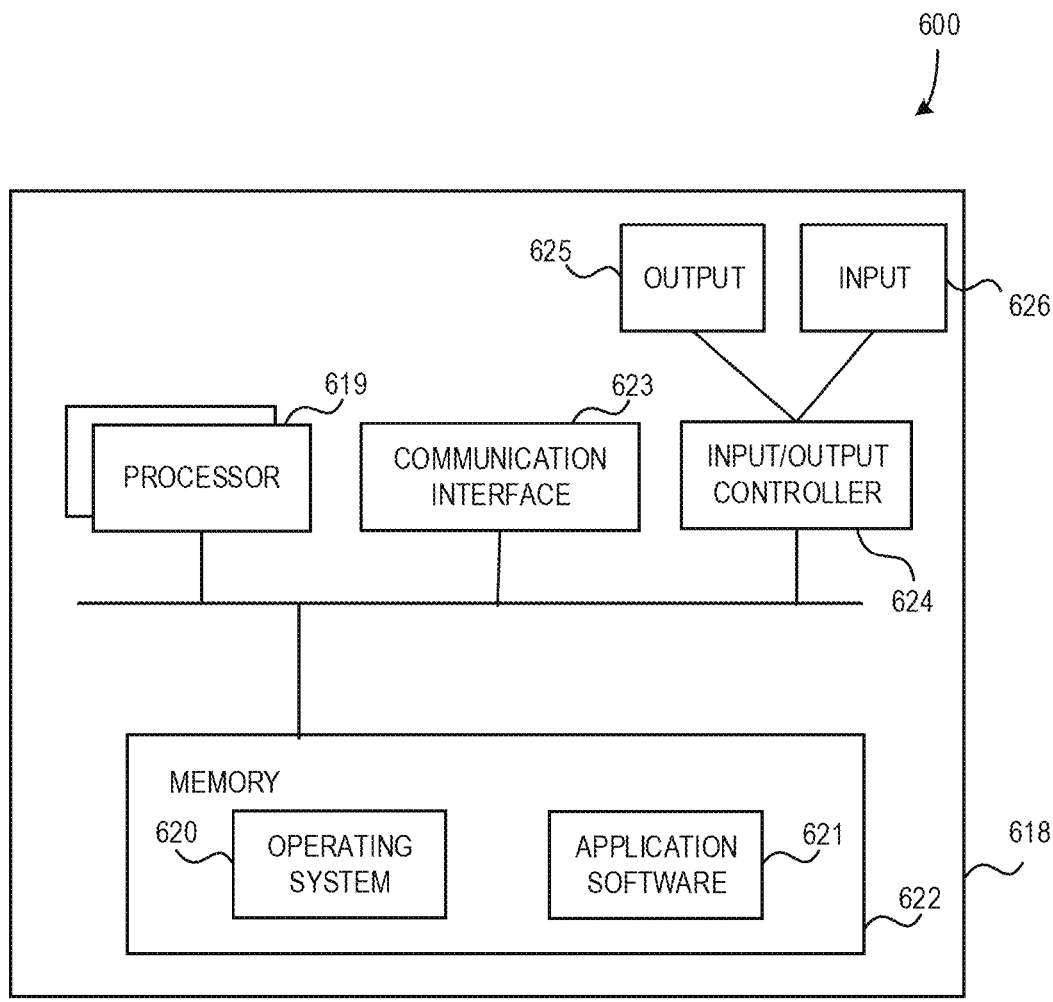
FIG. 6 illustrates a computing apparatus according to an embodiment as a functional block diagram.

The present disclosure is operable with a computing apparatus according to an embodiment as a functional block diagram 600 in FIG. 6. In an embodiment, components of a computing apparatus 618 may be implemented as a part of an electronic device according to one or more embodiments described in this specification. The computing apparatus 618 comprises one or more processors 619 which may be microprocessors, controllers or any other suitable type of processors for processing computer executable instructions to control the operation of the electronic device. Alternatively, or in addition, the processor 619 is any technology capable of executing logic or instructions, such as a hardcoded machine. Platform software comprising an operating system 620 or any other suitable platform software may be provided on the apparatus 618 to enable application software 621 to be executed on the device. According to an embodiment, causing database operations to be performed by microservices via a translation layer as described herein may be accomplished by software, hardware, and/or firmware.

Computer executable instructions may be provided using any computer-readable media that are accessible by the computing apparatus 618. Computer-readable media may include, for example, computer storage media such as a memory 622 and communications media. Computer storage media, such as a memory 622, include volatile and non-volatile, removable and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 622) is shown within the computing apparatus 618, it will be appreciated by a person skilled in the art, that the storage may be distributed or located remotely and accessed via a network or other communication link (e.g. using a communication interface 623).

The computing apparatus 618 may comprise an input/output controller 624 configured to output information to one or more output devices 625, for example a display or a speaker, which may be separate from or integral to the electronic device. The input/output controller 624 may also be configured to receive and process an input from one or more input devices 626, for example, a keyboard, a microphone or a touchpad. In one embodiment, the output device 625 may also act as the input device. An example of such a device may be a touch sensitive display. The input/output controller 624 may also output data to devices other than the output device, e.g. a locally connected printing device. In some embodiments, a user may provide input to the input device(s) 626 and/or receive output from the output device(s) 625.

The functionality described herein can be performed, at least in part, by one or more hardware logic components. According to an embodiment, the computing apparatus 618 is configured by the program code when executed by the processor 619 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example computer system comprises: at least one processor of a translation layer; and at least one memory comprising computer program code, the at least one memory and the computer program code configured to, with the at least one processor, cause the at least one processor to: expose a translation application program interface (API), wherein the translation API is configured to receive commands in an API command format; receive a command in the API command format via the exposed translation API from a command sender, the received command including a database type of a plurality of database types; identify a microservice configured to perform the received command based on the included database type from a plurality of microservices, wherein each microservice of the plurality of microservices is configured to be compatible with a database type of the plurality of database types; transfer the received command in the API command format to the identified microservice, wherein the identified microservice is configured to translate the transferred command from the API command format to a database command format associated with the database type included in the command and perform the translated command in the database command format in association with a database of the database type included in the received command; receive, from the identified microservice, a response based on performance of the received command by the identified microservice, wherein the received response is in a response format that is compatible with the exposed translation API; and provide, via the exposed translation API, the received response to the command sender.

A computerized method for causing a database operation to be performed via a microservice, the method comprising: exposing a translation API by a processor of a translation layer, wherein the translation API is configured to receive commands in an API command format; receiving, by the processor, a command in the API command format via the exposed translation API from a command sender, the received command including a database type of a plurality of database types; identifying a microservice configured to perform the received command based on the included database type from a plurality of microservices, by the processor, wherein each microservice of the plurality of microservices is configured to be compatible with a database type of the plurality of database types; transferring, by the processor, the received command in the API command format to the identified microservice, wherein the identified microservice is configured to translate the transferred command from the API command format to a database command format associated with the database type included in the command and perform the translated command in the database command format in association with a database of the database type included in the received command; receiving a response, by the processor, from the identified microservice, based on performance of the received command by the identified microservice, wherein the received response is in a response format that is compatible with the exposed translation API; and providing, by the processor, via the exposed translation API, the received response to the command sender.

One or more non-transitory computer storage media having computer-executable instructions for causing a database operation to be performed via a microservice that, upon execution by a processor, cause the processor to at least: expose a translation API, wherein the translation API is configured to receive commands in an API command format; receive a command in the API command format via the exposed translation API from a command sender, the received command including a database type of a plurality of database types; identify a microservice configured to perform the received command based on the included database type from a plurality of microservices, wherein each microservice of the plurality of microservices is configured to be compatible with a database type of the plurality of database types; transfer the received command in the API command format to the identified microservice, wherein the identified microservice is configured to translate the transferred command from the API command format to a database command format associated with the database type included in the command and perform the translated command in the database command format in association with a database of the database type included in the received command; receive, from the identified microservice, a response based on performance of the received command by the identified microservice, wherein the received response is in a response format that is compatible with the exposed translation API; and provide, via the exposed translation API, the received response to the command sender.

Alternatively, or in addition to the other examples described herein, examples include any combination of the following:

wherein the received command is a command to create a database of the database type; wherein identifying the microservice configured to perform the received command includes identifying a microservice configured to perform a database creation command associated with the database type; and wherein the response received from the identified microservice includes a database identifier associated with the database created by the microservice based on the received command.

further comprising: receiving, by the processor, a second command in the API command format via the exposed translation API from the command sender, the second command including the database identifier of the database created by the microservice; identifying, by the processor, a microservice configured to perform the second command based on the database type of the database identified by the database identifier from the plurality of microservices; transferring, by the processor, the second command to the identified microservice, wherein the identified microservice is configured to translate the second command from the API command format to a database command format associated with the database type of the database identified by the database identifier and perform the second command in the database command format in association with the database identified by the database identifier; receiving, by the processor, from the microservice to which the second command was transferred, a second response based on performance of the second command by the microservice, wherein the second response is in a response format that is compatible with the exposed translation API; and providing, by the processor, via the exposed translation API, the second response to the command sender.

wherein identifying the microservice configured to perform the received command based on the included database type further includes: based on determining that the plurality of microservices does not include an available microservice configured to perform the received command based on the included database type, creating, by the processor, a microservice configured to perform the received command, wherein the creating is based on a microservice definition associated with the included database type; and identifying the created microservice as the microservice configured to perform the received command.

wherein receiving the command further includes receiving a first command and a second command, wherein the first command includes a first database type and the second command includes a second database type; wherein identifying the microservice includes identifying a first microservice configured to perform the first command based on the first database type and identifying a second microservice configured to perform the second command based on the second database type; and wherein the first command is transferred to the first microservice and the second command is transferred to the second microservice, such that the first command and second command are performed in parallel by the first microservice and the second microservice, respectively.

wherein the received command further includes a command type and identifying the microservice further includes identifying a microservice that is configured to perform the received command based on the database type and based on the command type.

wherein the API command format is a REST format and the response format includes response data in a JSON format.

wherein the plurality of database types includes at least one of an SQL database type, an MSSQL database type, a POSTGRESQL database type, and a MYSQL database type.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for exposing a translation API by a processor of a translation layer, wherein the translation API is configured to receive commands in an API command format; exemplary means for receiving, by the processor, a command in the API command format via the exposed translation API from a command sender, the received command including a database type of a plurality of database types; exemplary means for identifying a microservice configured to perform the received command based on the included database type from a plurality of microservices, by the processor, wherein each microservice of the plurality of microservices is configured to be compatible with a database type of the plurality of database types; exemplary means for transferring, by the processor, the received command in the API command format to the identified microservice, wherein the identified microservice is configured to translate the transferred command from the API command format to a database command format associated with the database type included in the command and perform the translated command in the database command format in association with a database of the database type included in the received command; exemplary means for receiving a response, by the processor, from the identified microservice, based on performance of the received command by the identified microservice, wherein the received response is in a response format that is compatible with the exposed translation API; and exemplary means for providing, by the processor, via the exposed translation API, the received response to the command sender.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computerized method comprising:
    (a) receiving a request by a processor for provisioning a database of a database type compatible with a command type of a received command;
    (b) assigning, by the processor, an instance identifier to the request;
    (c) determining the database type compatible with the request;
    (e) determining, by the processor, that a container, compatible with the determined database type, is available, the container having been configured to contain a plurality of database instances of the determined database type;
    (f) determining, by the processor, that a service instance compatible with a database instances, of the plurality of databases instances, is available;
    (g) repurposing, by the processor, the service instance for use in provisioning the requested database;
    (h) creating service credential bindings of the service instance on a candidate database that is a candidate for the provisioning;
    (i) assigning the service credentials to a requesting user;
    (j) performing a smoke test to validate the candidate database, wherein the smoke test includes validating that a database technology version is a requested version and validating that a table has been created in the database;
    (k) upon determining that the smoke test is passed, updating the candidate database with user and service bindings;
    (l) provisioning the candidate database as provisioned database in response to the received request; and
    (m) upon determining that the smoke test is not passed, deleting the service instance and reprovisioning another service instance.

2. The computerized method of claim 1, wherein deleting the service instance and reprovisioning another service instance comprises:
    on determining that the smoke test is not passed, deleting the service instance, provisioning a different service instance, and repeating operations (h) to (j) until the smoke test is passed and then performing operation (l).

3. The computerized method of claim 1, wherein the received command includes a command to identify a microservice that performs the received request based on the database type.

4. The computerized method of claim 1, wherein the computerized method further includes confirming that the container satisfies the smoke test before performing the updating of the candidate database with user and service bindings.

5. The computerized method of claim 1, wherein the computerized method further includes confirming that entries in the candidate database have been done using an application programming interface (API).

6. The computerized method of claim 1, wherein the computerized method further comprises:
  on determining that a container, compatible with the determined database type, is not available, creating by the processor, a container compatible with the determined database type based on stored database configuration of the determined database type.

7. The computerized method of claim 1, wherein the computerized method further comprises:
  on determining that a compatible service instance is not available, provisioning by the processor, a compatible service instance using infrastructure as code.

8. The computerized method of claim 3, wherein the received command further includes a command type and identifying the microservice further includes identifying a microservice that performs the received command based on the database type and based on the command type.

9. A system comprising:
  at least one processor; and
  at least one memory storing computer program code, the computer program code when executed by the at least one processor, cause the at least one processor to:
    (a) receive a request for provisioning a database of a database type compatible with a command type of a received command;
    (b) assign an instance identifier to the request;
    (c) determine the database type compatible with the request;
    (e) determine that a container, compatible with the determined database type, is available, the container having been configured to contain a plurality of database instances of the determined database type;
    (f) determine that a service instance compatible with a database instances, of the plurality of databases instances, is available;
    (g) repurpose the service instance for use in provisioning the requested database;
    (h) create service credential bindings of the service instance on a candidate database that is a candidate for the provisioning;
    (i) assign the service credentials to a requesting user;
    (j) perform a smoke test to validate the candidate database, wherein the smoke test includes validating that a database technology version is a requested version and validating that a table has been created in the database;
    (k) upon determining that the smoke test is passed, update the candidate database with user and service bindings;
    (l) provision the candidate database as provisioned database in response to the received request; and
    (m) upon determining that the smoke test is not passed, delete the service instance and reprovision another service instance.

10. The computerized system of claim 9, wherein deleting the service instance and reprovisioning another service instance comprises:
  on determining that the smoke test is not passed, delete the service instance, provision a different service instance, and repeat operations (h) to (j) until the smoke test is passed and then perform operation (l).

11. The system of claim 9, wherein the received command includes a command to identify a microservice that performs the received request based on the database type.

12. The system of claim 9, wherein the computer program code executed by the at least one processor, further cause the at least one processor to:
  confirm that the container satisfies the smoke test before performing the updating of the candidate database with user and service bindings.

13. The system of claim 9, wherein the computer program code executed by the at least one processor, further cause the at least one processor to:
  confirm that entries in the candidate database have been done using an application programming interface (API).

14. The system of claim 9, wherein the computer program code executed by the at least one processor, further cause the at least one processor to:
  on determining that a container, compatible with the determined database type, is not available, create a container compatible with the determined database type based on stored database configuration of the determined database type.

15. The system of claim 9, wherein the computer program code executed by the at least one processor, further cause the at least one processor to:
  on determining that a compatible service instance is not available, provision a compatible service instance using infrastructure as code.

16. One or more non-transitory computer storage media having computer-executable instructions that, upon execution by a processor, cause the processor to at least:
  (a) receive a request for provisioning a database of a database type compatible with a command type of a received command;
  (b) assign an instance identifier to the request;
  (c) determine the database type compatible with the request;
  (e) determine that a container, compatible with the determined database type, is available, the container having been configured to contain a plurality of database instances of the determined database type;
  (f) determine that a service instance compatible with a database instances, of the plurality of databases instances, is available;
  (g) repurpose the service instance for use in provisioning the requested database;
  (h) create service credential bindings of the service instance on a candidate database that is a candidate for the provisioning;
  (i) assign the service credentials to a requesting user;
  (j) perform a smoke test to validate the candidate database, wherein the smoke test includes validating that a database technology version is a requested version and validating that a table has been created in the database;
  (k) upon determining that the smoke test is passed, update the candidate database with user and service bindings;
  (l) provision the candidate database as provisioned database in response to the received request; and
  (m) upon determining that the smoke test is not passed, delete the service instance and reprovision another service instance.

17. The one or more computer storage media of claim 16, wherein the computer-executable instructions, upon execution by a processor, further cause the processor to at least:
on determining that components involved in provisioning the database do not satisfy the smoke test, delete the service instance, provision a different service instance, and repeat operations (h) to (j) until the smoke test is passed and then perform operation (l).

18. The one or more computer storage media of claim 16, wherein the computer-executable instructions, upon execution by a processor, further cause the processor to at least: assign a service credential to a user that initiated the received request.

19. The one or more computer storage media of claim 16, wherein the computer-executable instructions, upon execution by a processor, further cause the processor to at least:
confirm that the container satisfies the smoke test before performing the updating of the candidate database with user and service bindings.

20. The one or more computer storage media of claim 16, wherein the computer-executable instructions, upon execution by a processor, further cause the processor to at least:
confirm that entries in the candidate database have been done using an application programming interface (API).

* * * * *